United States Patent [19]
Sugie et al.

[11] Patent Number: 5,851,250
[45] Date of Patent: Dec. 22, 1998

[54] FILTER ELEMENT FOR AIR CLEANER

[75] Inventors: Hiromichi Sugie; Tsuyoshi Minari; Yasunari Arai; Yukihisa Horikoh; Kouji Kume; Hirotsugu Kojima, all of Kariya, Japan

[73] Assignee: Toyoda Boshoku Corporation & Denso Corporation, Aichi, Japan

[21] Appl. No.: 778,030

[22] Filed: Jan. 2, 1997

[30] Foreign Application Priority Data

Jan. 12, 1996 [JP] Japan ................................. 8-003938

[51] Int. Cl.⁶ ................................................. B01D 39/16
[52] U.S. Cl. ........................................ 055/523; 055/529
[58] Field of Search ......................... 55/521, 523, 497, 55/529; 95/273; 210/510.1, 493.1, 493.3

[56] References Cited

U.S. PATENT DOCUMENTS

| | | | |
|---|---|---|---|
| 3,048,537 | 8/1962 | Pall et al. | 210/510 |
| 3,358,427 | 12/1967 | Bub | 55/521 |
| 3,410,062 | 11/1968 | Hart | 55/521 |
| 3,577,707 | 5/1971 | White | 55/523 |
| 4,056,375 | 11/1977 | Ringel et al. | 55/521 |
| 4,154,587 | 5/1979 | Gerok | 55/521 |
| 4,925,561 | 5/1990 | Ishii et al. | 210/493.3 |
| 4,976,857 | 12/1990 | Solomon | 55/521 |
| 5,547,481 | 8/1996 | Herding et al. | 55/523 |

FOREIGN PATENT DOCUMENTS

| | | |
|---|---|---|
| 0393374 | 10/1990 | European Pat. Off. . |
| 743085A2 | 11/1996 | European Pat. Off. . |
| 3024324 | 1/1982 | Germany ................. 55/523 |
| 3024324A1 | 1/1982 | Germany . |
| 3413213 | 10/1985 | Germany ................. 55/523 |
| 56-110736 | 9/1981 | Japan ........................ 55/523 |
| 5-25682 | 6/1993 | Japan . |
| PCT/DK/94/ 00329 | 3/1995 | WIPO . |

OTHER PUBLICATIONS abstract of Japan kokai 57–109837, Jul. 1982,55–523.

Primary Examiner—Duane S. Smith
Attorney, Agent, or Firm—Palmatier, Sjoquist, Voigt & Christensen, P.A.

[57] ABSTRACT

A filter element for an air cleaner including a filter medium which has a plurality of basic filter units and is integrally formed of a porous sintered material produced by sintering powdered synthetic resin.

13 Claims, 12 Drawing Sheets

FILTER ELEMENT FOR AIR CLEANER

BACKGROUND OF THE INVENTION

1. Field of the Invention

The present invention relates to a filter element to be incorporated into an air cleaner which filtrates or purifies air to be sucked into an internal combustion engine of an automobile.

2. Description of the Prior Art

A conventional typical filter element for an air cleaner of an automobile is constituted generally of a filter medium made of a sheet-like material, such as a filter paper or a non-woven fabric filtrating material, and a frame member made of a synthetic resin for retaining the filter medium. The filter medium is corrugated to maximize the filtration area thereof.

Further, different types of filter elements have been provided. For example, Japanese Utility Model Publication No. 5-25682 teaches a modified filter element which is known as a roll filter element. The filter element is formed by rolling up a sheet-like filter medium which is constituted of a flattened filter paper and a folded filter paper bonded to one surface of the filter paper.

However, the filter medium made of the filter paper or the non-woven fabric material tends to easily deform when air is sucked through the filter element. Thus, if the filter medium is closely folded to increase filtration area thereof, the filter medium may partially contact itself when the air is sucked through the filter element. This may cause clogging of the filter medium and decreasing of filtration capacity of the filter medium. As a result, each conventional filter element thus constructed can not be miniaturized without decreasing filtration area of the filter medium.

Additionally, the filter medium has to be folded and subsequently assembled to the frame member. This may lead to increased manufacturing cost of the filter element.

SUMMARY OF THE INVENTION

It is an object of the invention to provide a filter element which may be miniaturized without decreasing available filtration area of a filter medium.

It is another object of the invention to provide a filter element which can be manufactured at relatively low cost.

In order to attain the objects, the present invention provides a filter element for an air cleaner which includes a filter medium having a plurality of basic filter units and being integrally formed of a porous sintered material produced by sintering powdered synthetic resin.

The filter medium has extremely high flexural strength since it is made of the sintered material. Thus, the basic filter unit is prevented from contacting the adjacent basic filter unit when air is sucked through the filter element. This may effectively prevent reduction of filtration performance of the filter medium.

The filter medium is integrally formed by molding the sintered material. This may eliminate the need for a folding process and a bonding process, thereby contributing to reduction of the manufacturing cost of the filter element.

The filter medium exhibits excellent flexural strength and self-sustainability. Therefore, the filter element may be miniaturized without decreasing available filtration area of the filter medium.

The filter medium may have a honeycombed structure. Further, each of the basic filter units may be formed in three dimensions to increase the effective filtration area, and may be a bag-like or pocket shaped member constituted of a plurality of filtration walls and may have a polygonal opening edge and a closed edge opposed to the polygonal opening edge. Preferably, the polygonal shaped opening edge defines a regular polygon such as a square, rectangle, hexagon, or the like.

Each of the basic filter units may have a plurality of vertical edges each of which interconnects a point on the opening edge and a point on the closed edge. The vertical edges are defined by the filtration walls. Some of the vertical edges of the basic filter units may be joined with each other, and the closed edges of the basic filter units may be connected with each other.

All or some of the filtration walls may be plane walls or skew walls.

The filter element may include a cylindrical side wall surrounding the filter medium. The cylindrical side wall may be integral with the filter medium.

The filter medium may have a honeycombed structure. Further, each of the basic filter units may be a bottomed cylindrical member constituted of a plurality of filtration walls and may have a polygonal opening edge and a polygonal closure wall opposed to the polygonal opening edge.

The filter medium may have a corrugated structure. Further, each of the basic filter units may be a gutter-like or channel member constituted of a wedge-shaped filtration wall and a pair of side walls.

The filter element may include a frame surrounding the filter medium. The frame may be integral with the filter medium, and may be formed of powdered synthetic resin different from the powdered synthetic resin for the filter medium.

The present invention will become more fully apparent from the claims and the description as it proceeds in connection with the drawings.

DETAILED DESCRIPTION OF THE PREFERRED EMBODIMENTS

Preferred embodiments of the present invention will now be described in detail with reference to the drawings.

Referring to FIGS. 1 to 6, shown therein is a first embodiment of the invention.

Figure 1:
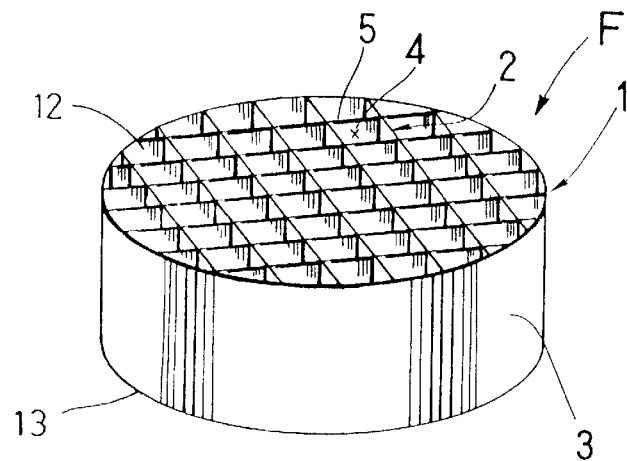
FIG. 1 is a perspective view of a filter element according to a first embodiment of the present invention.

As shown in FIG. 1, a filter element F is mainly constituted of a filter medium 1, and a cylindrical side wall 3 surrounding the filter medium 1. The filter medium 1 and the side wall 3 are integrally formed of a porous and rigid sintered material produced by sintering synthetic resin powder. In general, the filter element F additionally includes a frame (not shown) mounted on the side wall 3. The filter element F is incorporated into an air cleaner (not shown) of an automobile through the frame so as to filtrate or purify air to be introduced into an internal combustion engine.

The filter medium 1 has a square-based honeycombed structure with an upper or inlet side surface 12 and a lower or outlet side surface 13 parallel to the inlet side surface 12. The filter medium 1 is constituted of a plurality of basic filter units 2 each having a specific geometric configuration.

Figure 6:
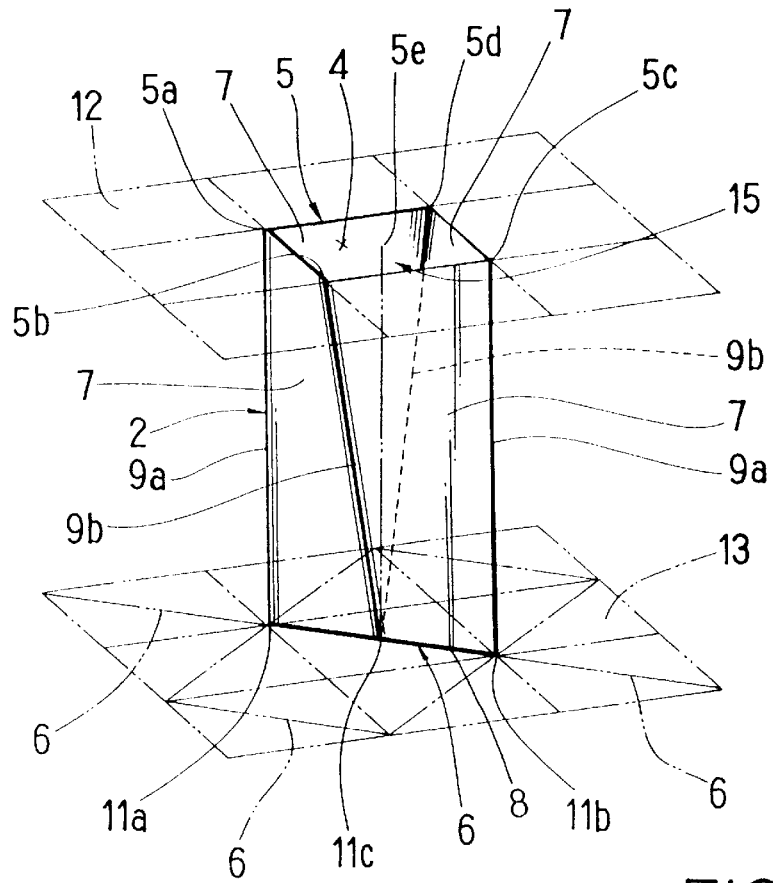
FIG. 6 is a view illustrating a geometric configuration of a basic unit of the filter medium.

As best shown in FIG. 6, each basic filter unit 2 is a bag-like or pocket shaped member constituted of four filtration walls 7, and has a square inlet port 4 opening to the inlet side surface 12 and a closed linear end 8 terminating in the outlet side surface 13. The basic filter unit 2 includes an opened square edge 5 having four vertexes 5a, 5b, 5c and 5d, a closed linear edge 6 having two end points 11a and 11b and a midpoint 11c, a pair of vertical edges 9a one of which interconnects the vertex 5a and the end point 11a and the other of which interconnects the vertex 5c and the end point 11b, and a pair of inclined vertical edges 9b one of which interconnects the vertex 5b and the midpoint 11c and the other of which interconnects the vertex 5d and the midpoint 11c. The square edge 5 is coplanar with the inlet side surface 12 and defines the square inlet port 4. The linear edge 6 is contained in the outlet side surface 13 and defines the linear closed end 8. The vertical edges 9a and the inclined vertical edges 9b cooperate with the square edge 5 and the linear edge 6 to confine the four filtration walls 7.

It is to be noted that the linear edge 6 extends along a projected line of a diagonal line interconnecting the vertexes 5a and 5c, that is, the end points 11a and 11b and the midpoint 11c correspond to projected points of the vertexes 5a and 5c and a center 5e of the square edge 5, respectively. In other words, the vertical edges 9a extend along perpendicular lines drawn from the vertex 5a and 5c to the outlet side surface 13, respectively, and the midpoint 11c is contained in a perpendicular line drawn from the center 5e to the outlet side surface 13. Therefore, each filtration wall 7 is a three-dimensional skew wall having a linear cross-sectional configuration. Additionally, the width of the filtration wall 7 is reduced toward the linear edge 6.

Figure 2:
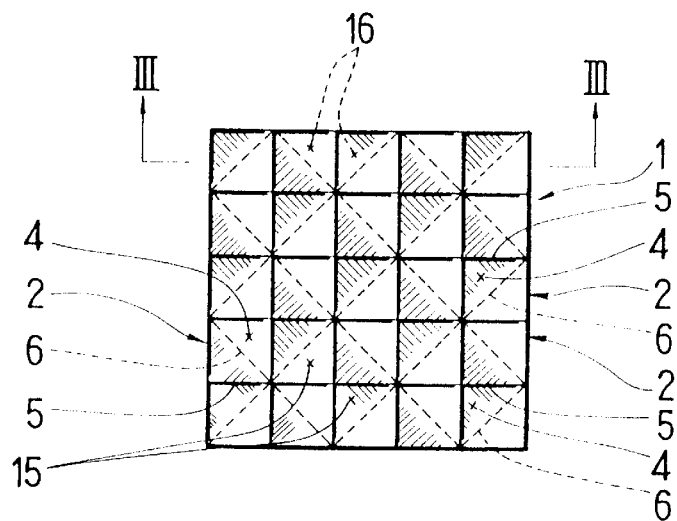
FIG. 2 is a plan view of the essential part of a filter medium of the filter element.
Figure 3:
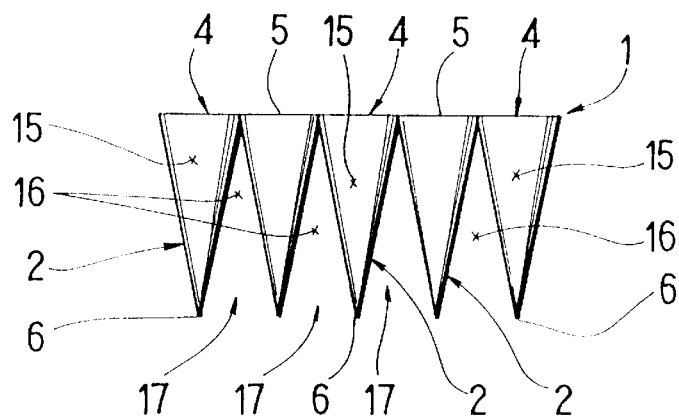
FIG. 3 is a sectional view taken along line III—III of FIG. 2.
Figure 4:
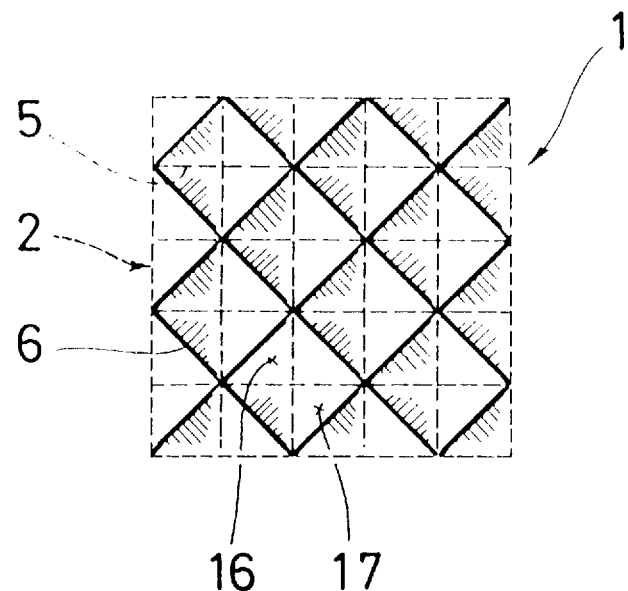
FIG. 4 is a bottom view of the essential part of the filter medium of the filter element.

In the filter medium 1 thus constructed, the inlet side surface 12 is divided by the square edges 5 into a square gridded pattern (FIG. 2). On the other hand, the outlet side surface 13 is also divided by the linear edges 6 into an enlarged square gridded pattern (FIG. 4). As will be appreciated, the gridded pattern of the outlet side surface 13 is inclined at 45 degrees relative to the gridded pattern of the inlet side surface 12 since each linear edge 6 corresponds to the diagonal line of the square edge 5. Additionally, the linear edges 6 cooperate to define a plurality of square outlet ports 17 (FIGS. 3 and 4). Thus, as shown in FIG. 3, the filter medium 1 includes a plurality of inlet channels 15 into which air to be filtrated is introduced through the inlet ports 4, and a plurality of outlet channels 16 from which air as filtrated is discharged to the outlet ports 17. Moreover, it is important to note that the filtration walls 7 of each basic filter unit 2 do not contact the filtration walls 7 of the adjacent basic filter unit 2 except for the square edge 5 and the vertical edges 9a.

Figure 5:
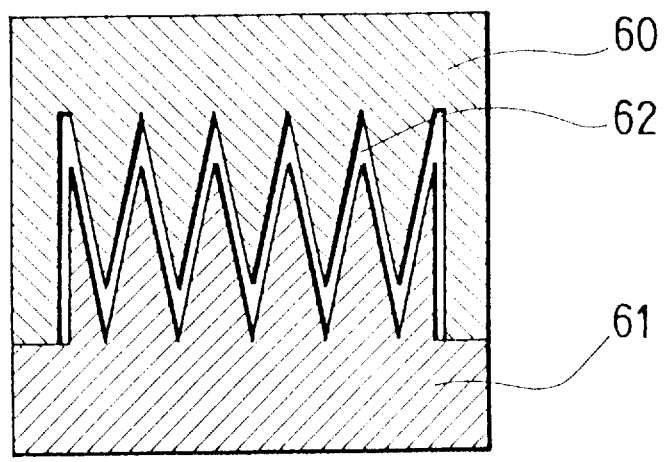
FIG. 5 is a sectional view of a molding die for forming the filter element.

As shown in FIG. 5, the filter medium 1 and the side wall 3 are integrally formed by utilizing an upper die 60 and a lower die 61 which has a molding space 62 therebetween. That is, the powdered synthetic resin, for example, polypropylene resin powder having particle diameter of from 100 to 800 micro meter, is filled in the molding space 62, and is then sintered at temperatures 10° to 50° C. higher than the melting point of the resin, thereby forming the filter medium 1 and the side wall 3.

The sintered synthetic resin is a porous and air permeable material and has high rigidity due to bonding of the particles of the powder. Therefore, the filter medium 1 thus formed exhibit filtration function for purifying the air, and has flexural strength and self-sustainability which may resist filtration load applied thereto. The filter medium 1 has extremely high flexural strength than a conventional filter medium made of a filter paper. Thus, the filtration walls 7 of the basic filter unit 2 are prevented from contacting those of the adjacent basic filter unit 2. This may effectively prevent reduction of filtration performance of the filter medium 1.

According to the present embodiment, the side wall 3 also exhibits a filtration function. This may lead to increased filtration capacity of the filter element F.

The filter medium 1 may be cleaned by water-washing since the sintered synthetic resin exhibits excellent water-resistivity. This may lead to easy maintenance of the filter element F.

The filter medium 1 is formed by molding of the powdered synthetic resin. This may eliminate the need for a folding process and a bonding process which are required in the conventional filter element, thereby contributing to reduction of the manufacturing cost of the filter element F.

The filter element F may be miniaturized without decreasing available filtration area of the filter medium 1. This is because the filter medium 1 has the honeycombed structure and exhibits excellent flexural strength and self-sustainability.

Although the basic filter units 2 are arranged in such a way that the linear edges 6 form the square gridded pattern on the outlet side surface 13, arrangement of the basic filter units 2 may be preferably modified, if required.

Figure 7:
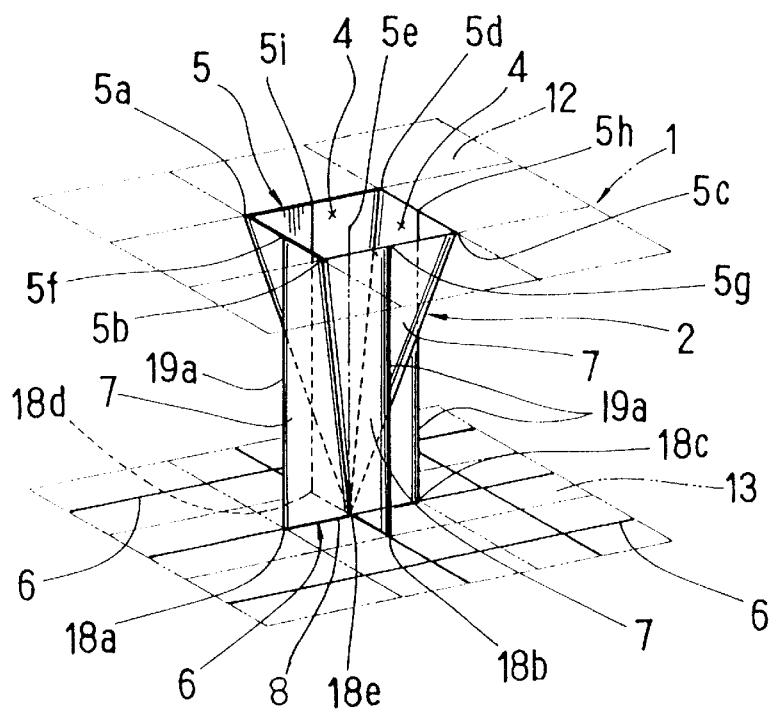
FIG. 7 is a view illustrating a geometric configuration of the basic unit of the filter medium according to a second embodiment of the present invention.

Referring to FIG. 7, shown therein is a second embodiment of the present invention. This embodiment is a modification of the first embodiment. Therefore, only the construction which is different from that in the first embodiment will be explained. Further, elements which are the same as or similar to those in the first embodiment are given like reference numbers and their description will not be repeated.

Each basic filter unit 2 is a bag-like or pocket shaped member constituted of eight filtration walls 7, and has a square inlet port 4 opening to an inlet side surface 12 and a closed cross-shaped end 8 terminating in an outlet side surface 13. The basic filter unit 2 includes an opened square edge 5 having four vertexes 5a, 5b, 5c and 5d and four midpoints 5f, 5g, 5h and 5i, a closed cross-shaped edge 6 having four end points 18a, 18b, 18c and 18d and an intersection 18e, four vertical edges 19a which interconnect the midpoints 5f, 5g, 5h and 5i and the end points 18a, 18b, 18c and 18d, respectively, and four inclined vertical edges 19b which interconnect the vertex 5a, 5b, 5c and 5d and the intersection 18e, respectively. The square edge 5 is coplanar with the inlet side surface 12 and defines the square inlet port 4. The cross-shaped edge 6 is contained in the outlet side surface 13 and defines the cross-shaped closed end 8. The vertical edges 19a and the inclined vertical edges 19b cooperate with the square edge 5 and the cross-shaped edge 6 to confine the eight filtration walls 7.

It is to be noted that the cross-shaped edge 6 extends along projected lines of two cross lines interconnecting the midpoints 5f, 5g, 5h and 5i, that is, the end points 18a, 18b, 18c and 18d and the intersection 18e correspond to projected points of the midpoints 5f, 5g, 5h and 5i and a center 5e of the square edge 5, respectively. In other words, the vertical edges 19a extend along a perpendicular line drawn from the midpoints 5f, 5g, 5h and 5i to the outlet side surface 13, respectively, and the intersection 18e is contained in a perpendicular line drawn from the center 5e to the outlet side surface 13. Therefore, each filtration wall 7 is a three-dimensional skew wall having a linear cross-sectional configuration.

Figure 8:
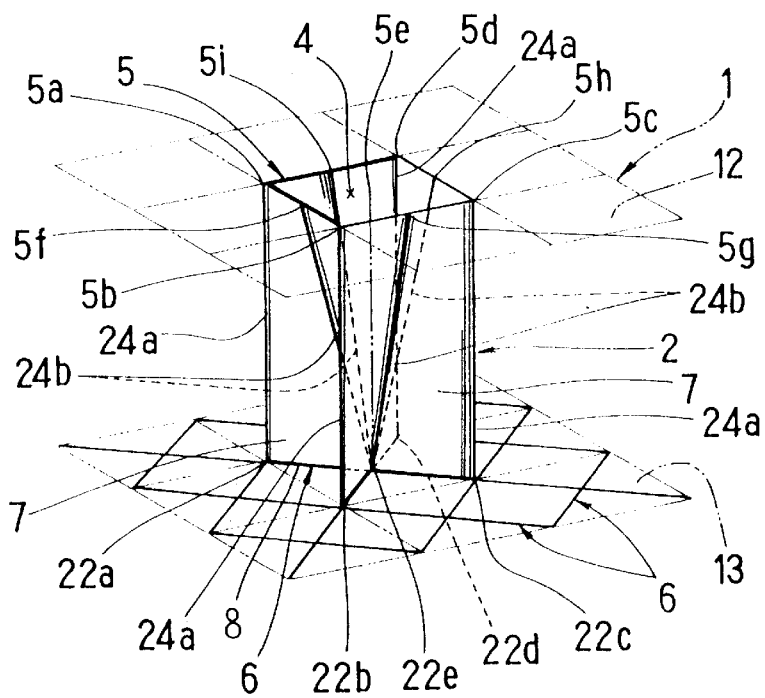
FIG. 8 is a view illustrating a geometric configuration of the basic unit of the filter medium according to a third embodiment of the present invention.

Referring to FIG. 8, shown therein is a third embodiment of the present invention. This embodiment is a modification of the first embodiment. Therefore, only the construction which is different from that in the first embodiment will be explained. Further, elements which are the same as or similar to those in the first embodiment are given like reference numbers and their description will not be repeated.

Each basic filter unit 2 is a bag-like or pocket shaped member constituted of eight filtration walls 7, and has a square inlet port 4 opening to an inlet side surface 12 and a closed cross-shaped end 8 terminating in an outlet side surface 13. The basic filter unit 2 includes an opened square edge 5 having four vertexes 5a, 5b, 5c and 5d and four midpoints 5f, 5g, 5h and 5i, a closed cross-shaped edge 6 having four end points 22a, 22b, 22c and 22d and an intersection 22e, four vertical edges 24a which interconnect the vertexes 5a, 5b, 5c and 5d and the end points 22a, 22b, 22c and 22d, respectively, and four inclined vertical edges 24b which interconnect the midpoints 5f, 5g, 5h and 5i and the intersection 22e, respectively. The square edge 5 is coplanar with the inlet side surface 12 and defines the square inlet port 4. The cross-shaped edge 6 is contained in the outlet side surface 13 and defines the cross-shaped closed end 8. The vertical edges 24a and the inclined vertical edges 24b cooperate with the square edge 5 and the cross-shaped edge 6 to confine the eight filtration walls 7.

It is to be noted that the cross-shaped edge 6 extends along projected lines of two diagonal lines of the square edge 5, that is, the end points 22a, 22b, 22c and 22d and the intersection 22e correspond to projected points of the vertexes 5a, 5b, 5c and 5d and a center 5e of the square edge 5, respectively. In other words, the vertical edges 24a extend along a perpendicular line drawn from the vertexes 5a, 5b, 5c and 5d to the outlet side surface 13, respectively, and the intersection 22e is contained in a perpendicular line drawn from the center 5e to the outlet side surface 13. Therefore, each filtration wall 7 is a three-dimensional skew wall having a linear cross-sectional configuration.

Figure 9:
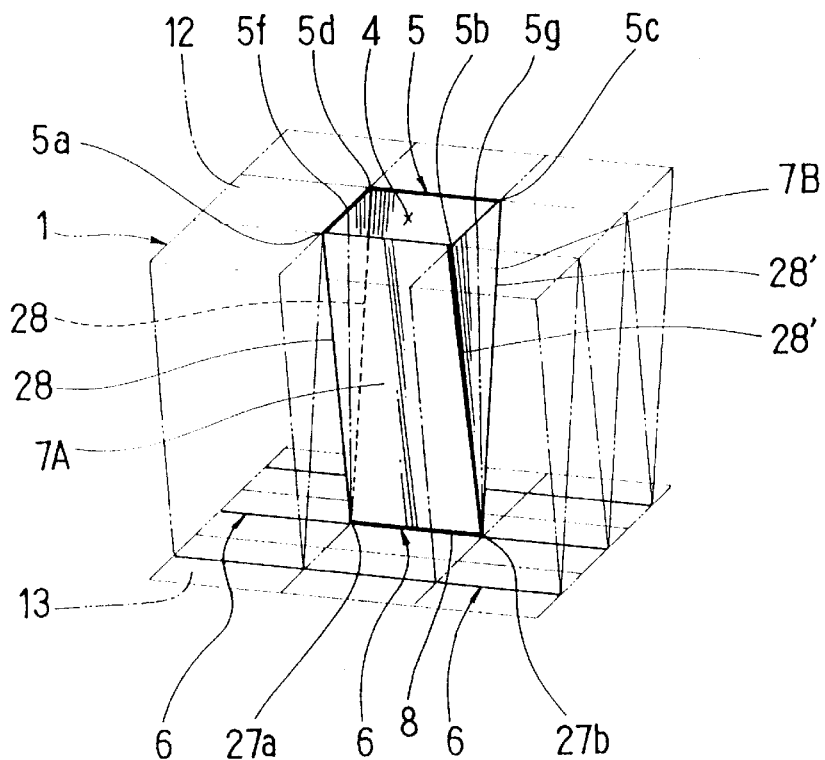
FIG. 9 is a view illustrating a geometric configuration of the basic unit of the filter medium according to a fourth embodiment of the present invention.

Referring to FIG. 9, shown therein is a fourth embodiment of the present invention. This embodiment is a modification of the first embodiment. Therefore, only the construction which is different from that in the first embodiment will be explained. Further, elements which are the same as or similar to those in the first embodiment are given like reference numbers and their description will not be repeated.

Each basic filter unit 2 is a bag-like or pocket shaped member constituted of a pair of filtration walls 7A and a pair of filtration walls 7B, and has a square inlet port 4 opening to an inlet side surface 12 and a linear closed end 8 terminating in an outlet side surface 13. The basic filter unit 2 includes a square edge 5 having four vertexes 5a, 5b, 5c and 5d, a linear edge 6 having two end points 27a and 27b, a pair of inclined vertical edges 28 which interconnect the vertexes 5a and 5d and the end point 27a, and a pair of inclined vertical edges 28' which interconnect the vertexes 5b and 5c and the end point 27b. The square edge 5 is coplanar with the inlet side surface 12 and defines the square inlet port 4. The linear edge 6 is contained in the outlet side surface 13 and defines the cross-shaped closed end 8. The adjacent inclined vertical edges 28 and 28' cooperate with the square edge 5 and the linear edge 6 to confine the filtration walls 7A. The adjacent inclined vertical edges 28 cooperate with the square edge 5 to confine one of the filtration walls 7B. Further, the adjacent inclined vertical edges 28' cooperate with the square edge 5 to confine the other of the filtration walls 7B.

It is to be noted that the linear edge 6 extends along a projected line of a line interconnecting a midpoint 5f between the vertexes 5a and 5d and a midpoint 5g between the vertexes 5b and 5c, that is, the end points 27a and 27b correspond to projected points of the midpoints 5f and 5g, respectively. In other words, the end points 27a and 27b are contained in perpendicular lines drawn from the midpoints 5f and 5g to the outlet side surface 13, respectively. Therefore, each filtration wall 7A is an inclined two-dimensional flat wall having a rectangular configuration. On the other hand, each filtration wall 7B is a two-dimensional flat wall having a triangular configuration and extending perpendicular to the outlet side surface 13.

In the fourth embodiment, the outlet side surface 13 is divided by the linear edges 6 into a striped pattern (FIG. 9). Additionally, the linear edges 6 cooperate to define a plurality of elongated outlet ports (not shown). As will be appreciated, the both ends of each elongated outlet port are defined by the peripheral edge of the side wall 3. Thus, the filter medium 1 includes a plurality of inlet channels (not shown) into which air to be filtrated is introduced through the inlet ports 4, and a plurality of gutter-like outlet channels (not shown) from which air as filtrated is discharged to the outlet ports. Moreover, it is important to note that the filtration walls 7B of each basic filter unit 2 are common to the filtration walls 7B of the adjacent basic filter units 2.

Referring to FIGS. 10 to 14, shown therein is a fifth embodiment of the invention. This embodiment is a modification of the first embodiment. Therefore, only the construction which is different from that in the first embodiment will be explained. Further, elements which are the same as or similar to those in the first embodiment are given like reference numbers and their description will not be repeated.

Figure 10:
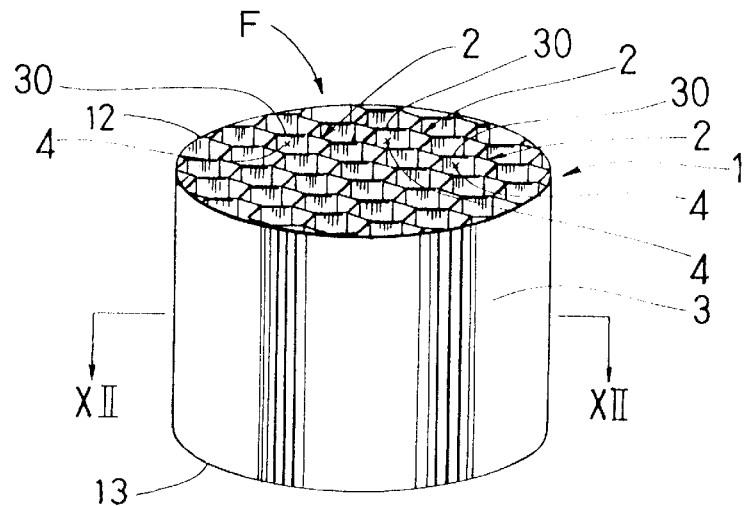
FIG. 10 is a perspective view of a filter element according to a fifth embodiment of the present invention.

As shown in FIG. 10, a filter element F is mainly constituted of a filter medium 1, and a side wall 3 surrounding the filter medium 1. The filter medium 1 and the side wall 3 are integrally formed of a porous and rigid sintered material produced by sintering of synthetic resin powder.

The filter medium 1 has a hexagon-based honeycombed structure with an inlet side surface 12 and an outlet side surface 13 parallel to the inlet side surface 12. The filter medium 1 is constituted of a plurality of basic filter units 2 each having a specific geometric configuration.

Figure 14:
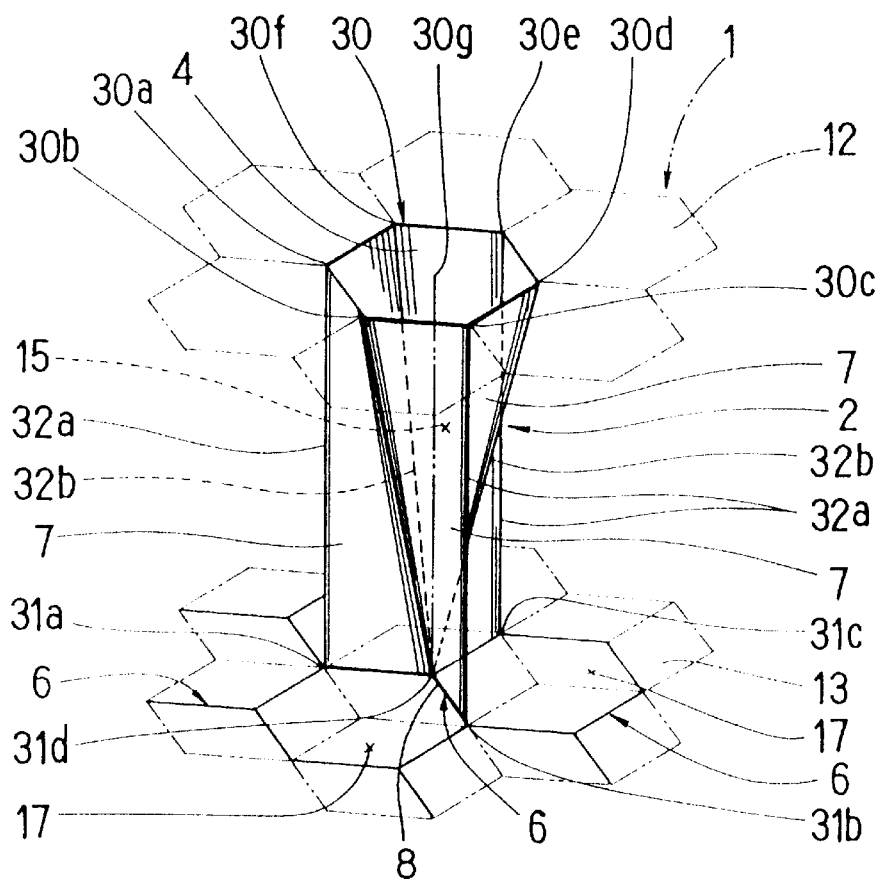
FIG. 14 is a view illustrating a geometric configuration of a basic unit of the filter medium.

As best shown in FIG. 14, each basic filter unit 2 is a bag-like or pocket shaped member constituted of six filtration walls 7, and has an opened regular hexagonal inlet port 4 opening to the inlet side surface 12 and a closed Y-shaped end 8 terminating in the outlet side surface 13. The basic filter unit 2 includes a regular hexagonal edge 30 having six vertexes 30a, 30b, 30c, 30d, 30e and 30f, a closed Y-shaped edge 6 having three end points 31a, 31b and 31c and a center 31d, three vertical edges 32a which interconnects the vertexes 30a, 30c and 30e and the end points 31a, 31b and 31c, respectively, and three inclined vertical edges 32b which interconnects the vertexes 30b, 30d and 30f and the center 31d. The regular hexagonal edge 30 is coplanar with the inlet side surface 12 and defines the square inlet port 4. The Y-shaped edge 6 is contained in the outlet side surface 13 and defines the Y-shaped closed end 8. The vertical edges 32a and the inclined vertical edges 32b cooperate with the regular hexagonal edge 30 and the Y-shaped edge 6 to confine the six filtration walls 7.

It is to be noted that the Y-shaped edge 6 extends along projected lines of three segment lines interconnecting the vertexes 30a, 30c and 30e and a center 30g of the regular hexagonal edge 30, that is, the end points 31a, 31b and 31c and the center 31d correspond to projected points of the vertexes 30a, 30c and 30e and the center 30g of the regular hexagonal edge 30, respectively. In other words, the three vertical edges 32a extends along perpendicular lines drawn from the vertex 30a, 30c and 30d to the outlet side surface 13, and the center 31d is contained in a perpendicular line drawn from the center 30g to the outlet side surface 13. Therefore, each filtration wall 7 is a three-dimensional skew wall having a linear cross-sectional configuration.

Figure 11:
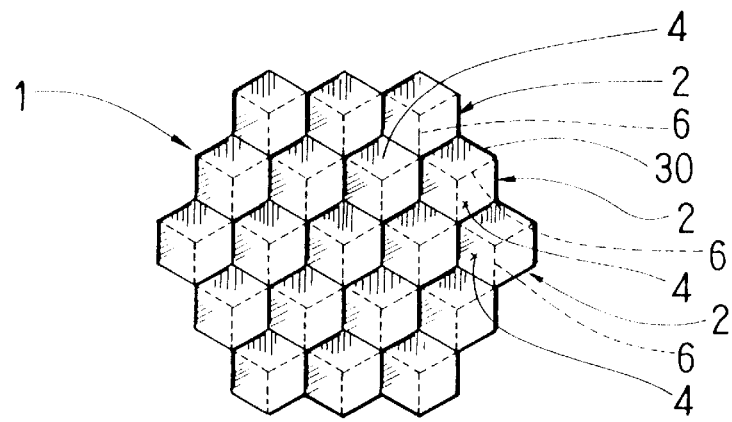
FIG. 11 is a plan view of the essential part of a filter medium of the filter element.
Figure 12:
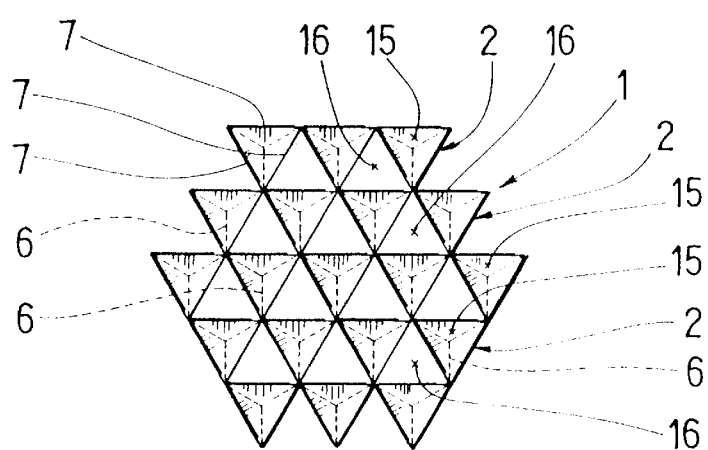
FIG. 12 is a sectional view taken along line XII—XII of FIG. 10.
Figure 13:
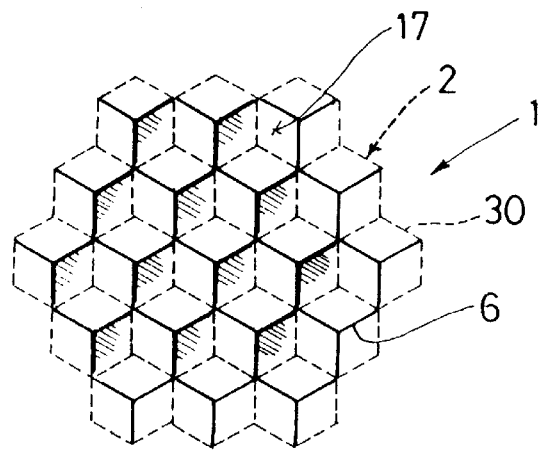
FIG. 13 is a bottom view of the essential part of the filter medium of the filter element.

In the filter medium 1 thus constructed, the inlet side surface 12 is divided by the regular hexagonal edges 30 into a regular hexagon-based honeycombed pattern (FIG. 11). On the other hand, the outlet side surface 13 is also divided by the Y-shaped edges 6 into a regular hexagon-based honeycombed pattern (FIG. 13). As will be appreciated, the pattern of the outlet side surface 13 is inclined at 60 degrees relative to the pattern of the inlet side surface 12. Additionally, the Y-shaped edges 6 cooperate to define a plurality of regular hexagonal outlet ports 17 (FIG. 13). Thus, as shown in FIG. 12, the filter medium 1 includes a plurality of inlet channels 15 into which air to be filtrated is introduced through the inlet ports 4, and a plurality of outlet channels 16 from which air as filtrated is discharged to the outlet ports 17. Moreover, it is important to note that the filtration walls 7 of each basic filter unit 2 do not contact the filtration walls 7 of the adjacent basic filter unit 2 except for the regular hexagonal edge 30 and the vertical edges 32a.

Figure 15:
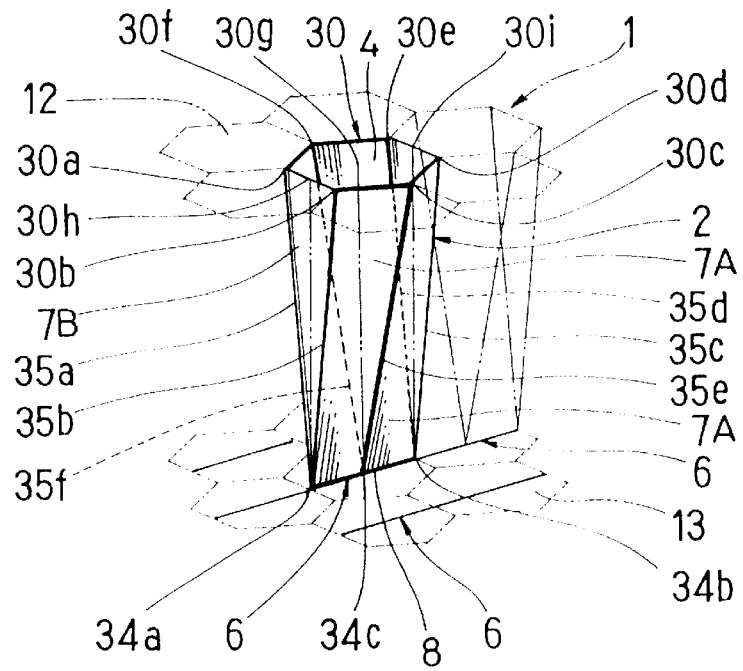
FIG. 15 is a view illustrating a geometric configuration of the basic unit of the filter medium according to a sixth embodiment of the present invention.

Referring to FIG. 15, shown therein is a sixth embodiment of the present invention. This embodiment is a modification of the fifth embodiment. Therefore, only the construction which is different from that in the fifth embodiment will be explained. Further, elements which are the same as or similar to those in the fifth embodiment are given like reference numbers and their description will not be repeated.

Each basic filter unit 2 is a bag-like or pocket shaped member constituted of four filtration walls 7A, two filtration walls 7B, and has a regular hexagonal inlet port 4 opening to the inlet side surface 12 and a closed linear end 8 terminating in the outlet side surface 13. The basic filter unit 2 includes an opened regular hexagonal edge 30 having six vertexes 30a, 30b, 30c, 30d, 30e and 30f, a closed linear edge 6 having two end points 34a and 34b and a center 34c, two inclined vertical edges 35a and 35b which interconnects the vertexes 30a and 30b and the end points 34a, respectively, two inclined vertical edges 35c and 35d which interconnects the vertexes 30d and 30e and the end points 34b, respectively, and two inclined vertical edges 35e and 35f which interconnect the vertexes 30c and and 30f and the center 34c, respectively. The regular hexagonal edge 30 is coplanar with the inlet side surface 12 and defines the square inlet port 4. The linear edge 6 is contained in the outlet side surface 13 and defines the linear closed end 8. The inclined vertical edges 35a and 35b, and 35c and 35d cooperate with the regular hexagonal edge 30 to confine the two filtration walls 7B. On the other hand, the inclined vertical edges 35b and 35e, 35c and 35e, 35d and 35f, and 35a and 35f cooperate with the regular hexagonal edge 30 and the linear edge 6 to confine the four filtration walls 7A.

It is to be noted that the linear edge 6 extends along projected line of a segment line interconnecting a midpoint 30h of the vertexes 30a and 30b and a midpoint 30i of the vertexes 30d and 30e, that is, the end points 34a and 34b and the center 34c correspond to projected points of the midpoints 30h, 30i and the center 30g of the regular hexagonal edge 30, respectively. In other words, the end points 34a and 34b and the center 34c are contained in a perpendicular lines drawn from the midpoints 30h, 30i and the center 30 to the outlet side surface 13, respectively. Therefore, each filtration wall 7A is a three-dimensional skew wall having a linear cross-sectional configuration. On the other hand, each filtration wall 7B is a two-dimensional flat wall having a triangular configuration and extending perpendicular to the outlet side surface 13.

In the sixth embodiment, the outlet side surface 13 is divided by the linear edges 6 into a striped pattern (FIG. 15). Additionally, the linear edges 6 cooperate to define a plurality of elongated outlet ports (not shown). As will be appreciated, the both ends of each elongated outlet port are defined by the peripheral edge of the side wall 3. Thus, the filter medium 1 includes a plurality of inlet channels (not shown) into which air to be filtrated is introduced through the inlet ports 4, and a plurality of gutter-like outlet channels (not shown) from which air as filtrated is discharged to the outlet ports. Moreover, it is important to note that the filtration walls 7A of each basic filter unit 2 are common to the filtration walls 7B of the adjacent basic filter units 2.

Figure 16:
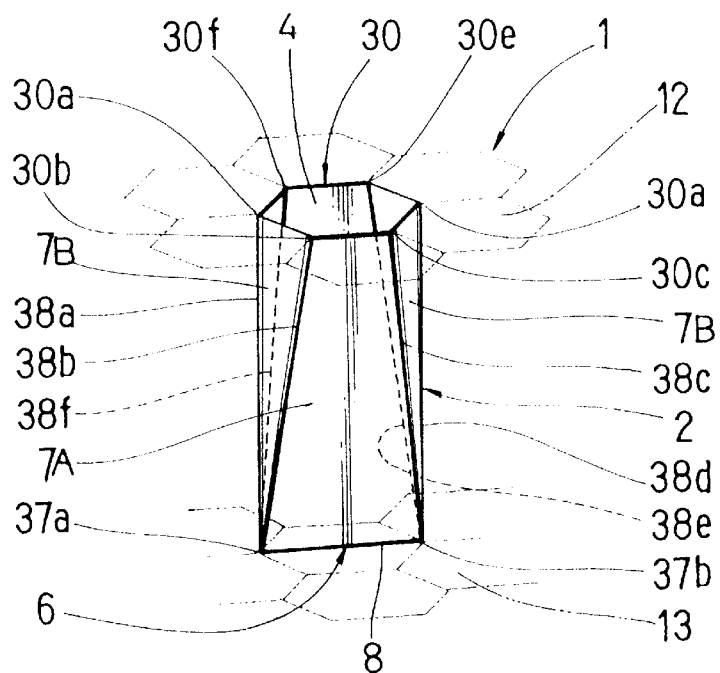
FIG. 16 is a view illustrating a geometric configuration of the basic unit of the filter medium according to a seventh embodiment of the present invention.
Figure 17:
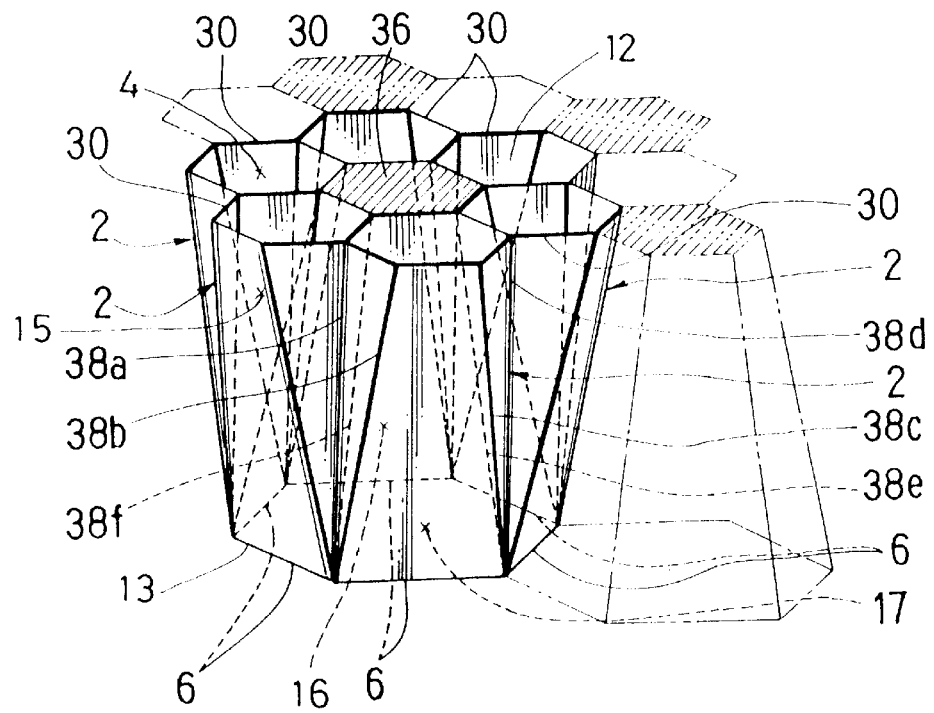
FIG. 17 is a view illustrating arrangement of six filter mediums of FIG. 16.

Referring to FIGS. 16 and 17, shown therein is a seventh embodiment of the present invention. This embodiment is a modification of the fifth embodiment. Therefore, only the construction which is different from that in the fifth embodiment will be explained. Further, elements which are the same as or similar to those in the fifth embodiment are given like reference numbers and their description will not be repeated.

Each basic filter unit 2 is a bag-like or pocket shaped member constituted of two filtration walls 7A, four filtration walls 7B, and has a regular hexagonal inlet port 4 opening to the inlet side surface 12 and a linear closed end 8 terminating in the outlet side surface 13. The basic filter unit 2 includes a regular hexagonal edge 30 having six vertexes 30a, 30b, 30c, 30d, 30e and 30f, a linear edge 6 having two end points 37a and 37b, two vertical edges 38a and 38d which interconnect the vertexes 30a and 30d to the end points 37a and 37b, respectively, two inclined vertical edges 38b and 38f which interconnect the vertexes 30b and 30f to the end point 37a, and two inclined vertical edges 38c and 38e which interconnect the vertexes 30c and 30f to the end point 37b. The regular hexagonal edge 30 is coplanar with the inlet side surface 12 and defines the square inlet port 4. The linear edge 6 is contained in the outlet side surface 13 and defines the linear closed end 8. The vertical edge 38a cooperates with the inclined vertical edges 38b and 38f and the regular hexagonal edge 30 to confine the two filtration walls 7B. Similarly, the vertical edge 38d cooperates with the inclined vertical edges 38c and 38e and the regular hexagonal edge 30 to confine the two filtration walls 7B. On the other hand, the inclined vertical edges 38b and 38c cooperate with the regular hexagonal edge 30 and the linear edge 6 to confine the filtration walls 7A. Similarly, the inclined vertical edges 38e and 38f cooperate with the regular hexagonal edge 30 and the linear edge 6 to confine the filtration walls 7A.

It is to be noted that the linear edge 6 extends along projected line of a diagonal line interconnecting the vertexes 30a and 30d, that is, the end points 37a and 37b correspond to projected points of the vertexes 30a and 30d, respectively. In other words, the end points 37a and 37b are contained in a perpendicular lines drawn from the vertexes 30a and 30d to the outlet side surface 13, respectively. Therefore, each filtration wall 7A is a two-dimensional flat wall having a trapezoidal configuration. On the other hand, each filtration wall 7B is a two-dimensional flat wall having a triangular configuration and extending perpendicular to the outlet side surface 13.

In the seventh embodiment, the basic filter units 2 are arranged so that the outlet side surface 13 is divided by the linear edges 6 into a regular hexagonal gridded pattern. As will be appreciated, in this arrangement, the filter medium 1 necessarily has a plurality of empty spaces. Therefore, the filter medium 1 includes a plurality of closure walls 36 to close the empty spaces. Each closure wall 36 is coplanar with the inlet side surface 12 and is formed with the same material as that of the filter medium 1. Additionally, the linear edges 6 cooperate to define a plurality of regular hexagonal outlet ports 17. Thus, the filter medium 1 includes a plurality of inlet channels 15 into which air to be filtrated is introduced through the inlet ports 4, and a plurality of enlarged outlet channels 16 from which air as filtrated is discharged to the outlet ports. Moreover, it is important to note that the filtration walls 7B of each basic filter unit 2 are common to the filtration walls 7B of the adjacent basic filter units 2.

Referring to FIGS. 18 to 23, shown therein is an eighth embodiment of the invention. This embodiment is a modification of the first embodiment. Therefore, only the construction which is different from that in the first embodiment will be explained. Further, elements which are the same as or similar to those in the first embodiment are given like reference numbers and their description will not be repeated.

Figure 18:
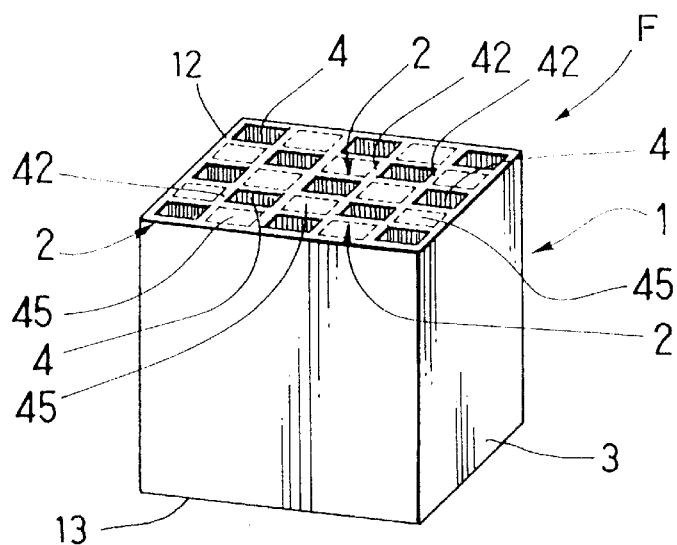
FIG. 18 is a perspective view of a filter element according to an eighth embodiment of the present invention.

As shown in FIG. 18, a filter element F is mainly constituted of a filter medium 1, and a side wall 3 enclosing the filter medium 1 and having a square configuration. The filter medium 1 and the side wall 3 are integrally formed of a porous and rigid sintered material produced by sintering synthetic resin powder.

Figure 19:
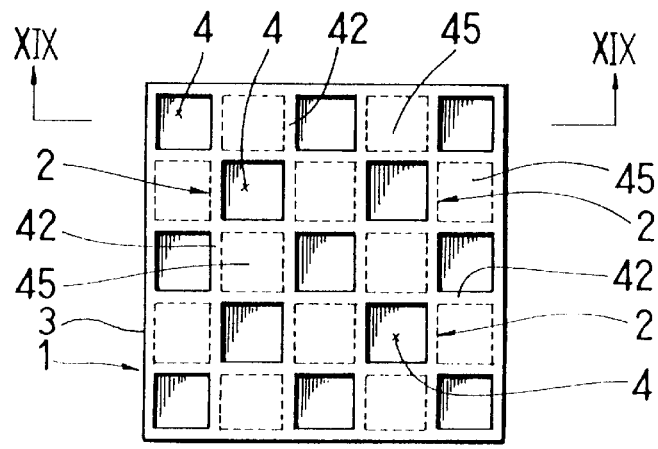
FIG. 19 is a plan view of a filter medium of the filter element.
Figure 20:
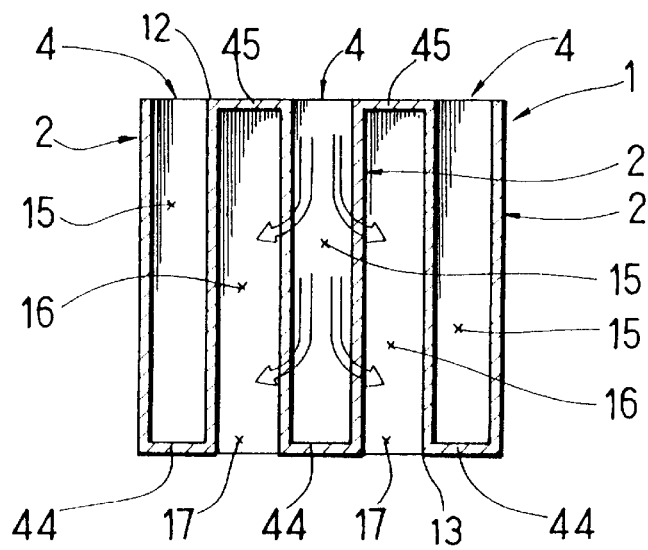
FIG. 20 is a sectional view taken along line XIX—XIX of FIG. 19.
Figure 21:
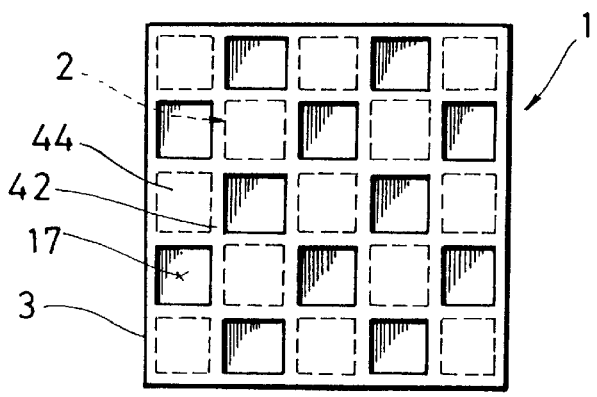
FIG. 21 is a bottom view of the filter medium of the filter element.

The filter medium 1 has a square-based honeycombed structure with an inlet side surface 12 and an outlet side surface 13 parallel to the inlet side surface 12. The filter medium 1 is essentially constituted of a plurality of basic filter units 2 each having a square cylindrical configuration. Each basic filter unit 2 has a square cylindrical configuration and is constituted of four side filtration walls 42 and a bottom filtration wall 44 coplanar with the outlet side surface 13. As best shown in FIG. 19, the basic filter units 2 are regularly arranged so that a plurality of square through bores are alternately formed between the basic filter units 2.

It is to be noted that the filter medium 1 includes a plurality of closure walls 45 to close the through bores. The closure walls 45 are formed of the same material as that of the filter medium 1. Further, the closure walls 45 are integrally formed with the filter medium 1 and adapted to coplanar with the inlet side surface 12. Additionally, the filter medium 1 has a plurality of square inlet ports 4 opening to the inlet side surface 12 and a plurality of square outlet ports 17 opening to the outlet side surface 13. Thus, the filter medium 1 includes a plurality of inlet channels 15 into which air to be filtrated is introduced through the inlet ports 4, and a plurality of enlarged outlet channels 16 from which air as filtrated is discharged to the outlet ports 17. It should be understood that the side wall 3 is partly common to the filtration walls 42 of the basic filter unit 2 arranged therealong.

Figure 22:
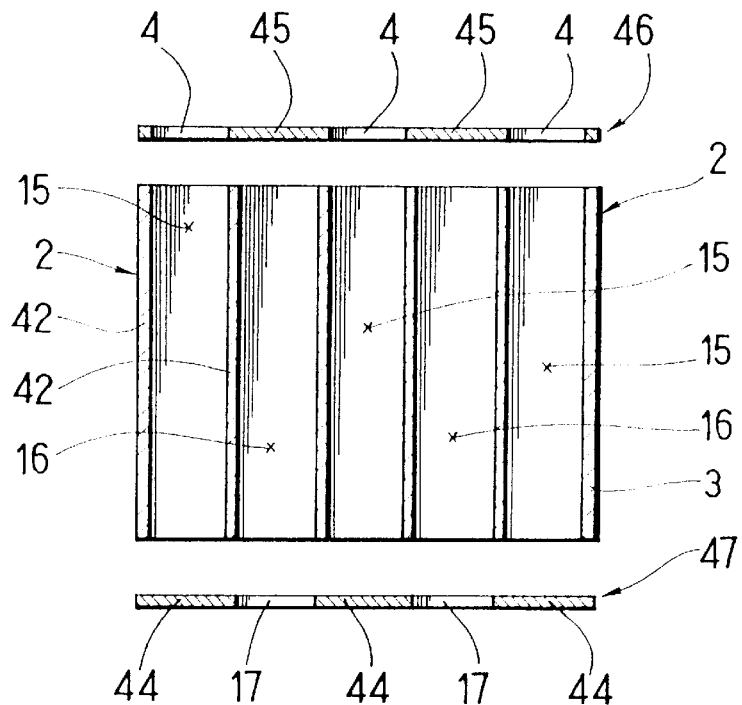
FIG. 22 is an exploded sectional view of the filter medium in a modified form.

The filter medium 1 in the eighth embodiment may be preferably modified. As shown in FIG. 22, in a modified form, each basic filter unit 2 has a bottomless square cylindrical configuration and is constituted of four side filtration walls 42. The filter medium 1 additionally includes an inlet side plate 46 having a plurality of inlet ports 4 and a plurality of closure walls 45, and an outlet side plate 47 having a plurality of bottom filtration walls 44 and a plurality of outlet ports 17. The inlet side plate 46 and the outlet side plate 47 are combined to the filter medium 1 by bonding or welding. Thus, the filter medium 1 is formed with a plurality of inlet channels 15 into which air to be filtrated is introduced through the inlet ports 4, and a plurality of enlarged outlet channels 16 from which air as filtrated is discharged to the outlet ports 17.

Figure 23:
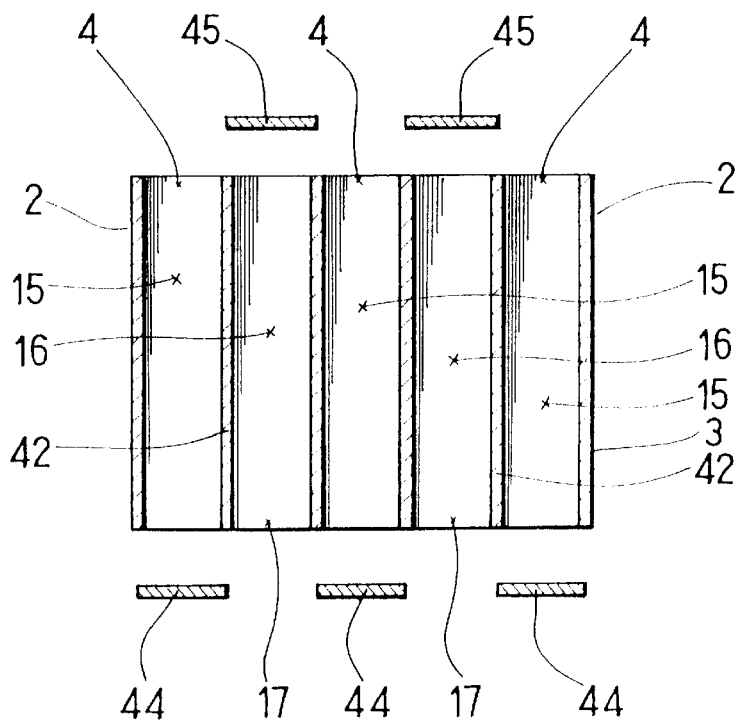
FIG. 23 is an exploded sectional view of the filter medium in another modified form.

The filter medium 1 in the eighth embodiment may be further modified. As shown in FIG. 23, in a modified form, each basic filter unit 2 has a bottomless square cylindrical configuration and is constituted of four side filtration walls 42. The filter medium 1 additionally includes a plurality of closure walls 45, and a plurality of bottom filtration walls 44. The closure walls 45 and the bottom filtration walls 44 are combined to the filter medium 1 by bonding or welding. Thus, the filter medium 1 is formed with a plurality of inlet channels 15 into which air to be filtrated is introduced through the inlet ports 4, and a plurality of enlarged outlet channels 16 from which air as filtrated is discharged to the outlet ports 17.

It is to be noted that the filter medium 1 of eighth embodiment may be further modified. For example, the basic filter units 2 may have triangular or rectangular cylindrical configuration.

Figure 24:
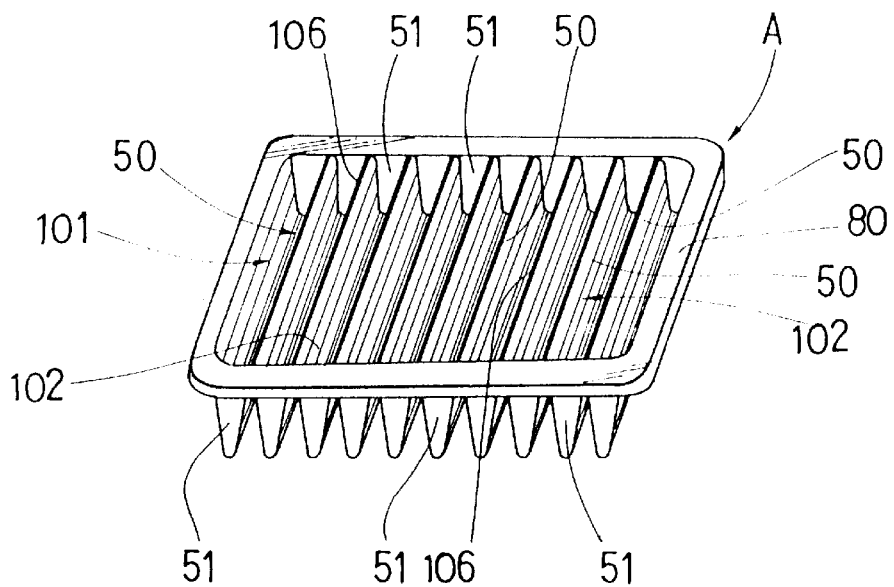
FIG. 24 is a perspective view of a filter element according to a ninth embodiment of the present invention.
Figure 25:
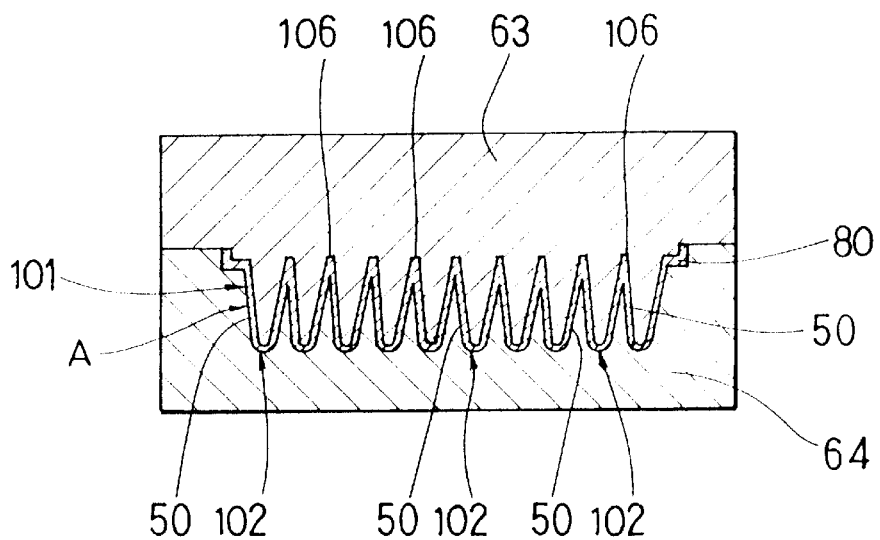
FIG. 25 is a sectional view of a molding die for forming the filter element, illustrating a condition in which the filter element is molded.
Figure 26:
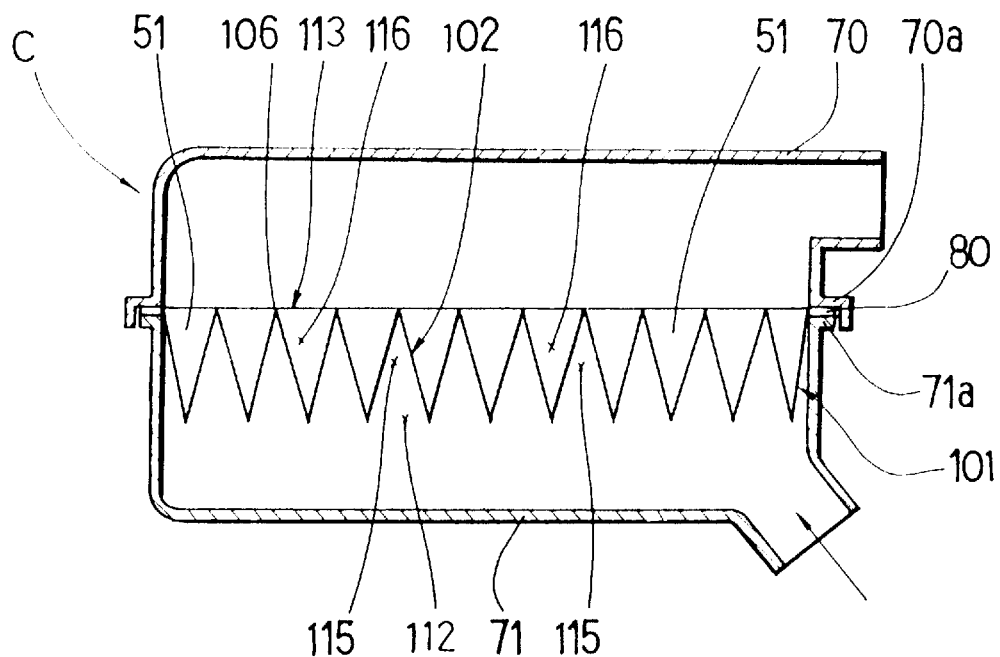
FIG. 26 is a sectional view of an air cleaner in which the filter element is mounted.

Referring to FIGS. 24 to 26, shown therein is a ninth embodiment of the invention.

As best shown in FIG. 24, a filter element A is constituted of a filter medium 101, and a rectangular frame 80 to which the filter medium 101 is integrally incorporated. The filter medium 101 and the frame 80 are integrally formed of a porous and rigid sintered material produced by sintering synthetic resin powder.

The filter medium 101 has an inlet side surface 112 and an outlet side surface 113, and is constituted of a plurality of basic filter units 102 which are integrally connected at connecting edges 106 to form a corrugated structure. Each basic filter unit 102 is constituted of a wedge-shaped filtration wall 50 and a pair of end walls or side walls 51. As shown in FIG. 26, the filter medium 101 thus constructed has a plurality of inlet channels 115 facing the inlet side surface 112 and a plurality of outlet channels 116 facing the outlet side surface 113.

As shown in FIG. 25, the filter medium 101 and the frame 80 are integrally formed by utilizing an upper die 63 and a lower die 64. That is, the powdered synthetic resin, for example, polypropylene resin powder is filled in a molding space between the upper die 63 and the lower die 64, and then sintered at a suitable temperature, thereby forming the filter element A.

As shown in FIG. 26, the filter element A thus formed is incorporated into an air cleaner C having an upper casing 70 and a lower casing 71, in which the frame 80 of the filter element A is received between a peripheral edge 70a of the upper casing 70 and a peripheral edge 71a of the lower casing 71. Then, the frame 80 is bonded to the peripheral edges 70a and 71a by welding or the like, thereby fixing the filter element A to the air cleaner C. It is preferable that the casings 70 and 71 are formed of synthetic resin having properties identical with those of the synthetic resin for the filter element A.

According to this embodiment, the frame 80 exhibits filtration function. This may lead to increased filtration capacity of the filter element A. Further, the filter medium 101 is integrally formed with the frame 80. This may eliminate the need for a folding process of the filter medium 101 and a connecting process of the filter medium 101 to the frame 80, thereby reducing the manufacturing cost of the filter element A.

Further, the filter element A is assembled by welding the frame 80 to the peripheral edges 70a and 71a of the casings 70 and 71. This may eliminate the need for a sealing mechanism between the filter element A and the casings 70 and 71 of the air cleaner C.

Further, both of the filter medium 101 and the frame 80 are made of the sintered synthetic resin. This may facilitate reuse of the filter element A.

Additionally, the filter element A may be miniaturized without decreasing available filtration area of the filter medium 101. This is because the filter medium 101 exhibits excellent flexural strength and self-sustainability.

Figure 27:
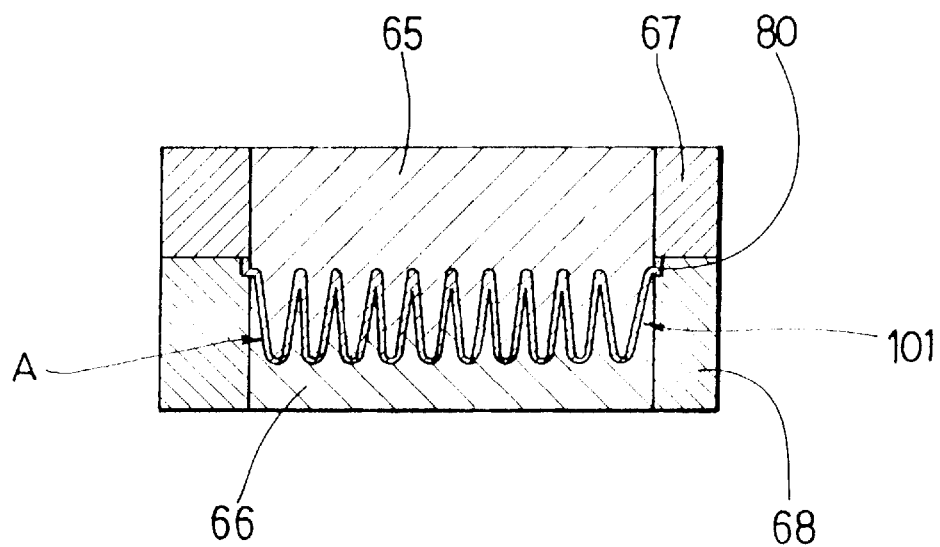
FIG. 27 is a view similar to FIG. 25, illustrating a filter element according to a tenth embodiment of the present invention.

Referring to FIG. 27, shown therein is a tenth embodiment of the present invention. This embodiment is a modification of the ninth embodiment. Therefore, only the construction which is different from that in the ninth embodiment will be explained. Further, elements which are the same as or similar to those in the ninth embodiment are given like reference numbers and their description will not be repeated.

A filter element A is constituted of a filter medium 101, and a rectangular frame 80. The filter medium 101 is formed of synthetic resin powder. Whereas, the frame 80 is formed of synthetic resin powder which is different from the synthetic resin powder for the filter medium 101. The synthetic resin powder for the frame 80 has softness and elasticity greater than those of the synthetic resin powder for the filter medium 101, and exhibits high affinity for the synthetic resin powder for the filter medium 101.

As shown in FIG. 27, the filter medium 101 and the frame 80 are integrally formed by utilizing an upper die 65 and a lower die 66 for forming the filter medium 101 and an upper die 67 and a lower die 68 for forming the frame 80. That is, the powdered synthetic resin for the filter medium 101 is filled in a molding space between the upper die 65 and the lower die 66, and the powdered synthetic resin for the frame 80 is filled in a molding space between the upper die 67 and the lower die 68. Then, the both of the powdered synthetic resins are sintered, thereby forming the filter element A. As will be easily understood, the dies 65 and 66 are heated to a temperature suitable for sintering the powdered synthetic resin for the filter medium 101, and the dies 67 and 68 are heated to a temperature suitable for sintering the powdered synthetic resin for the frame 80.

In this embodiment, the filter element A thus formed is incorporated into an air cleaner (not shown) having an upper casing and a lower casing, in which the frame 80 is closely received between a peripheral edge of the upper casing and a peripheral edge of the lower casing. Then, the frame 80 is fixed between the peripheral edges of the upper and lower casings by clamping or the like, thereby mounting the filter element A to the air cleaner.

According to this embodiment, the frame 80 of the filter element A is formed of the highly elastic material. This may eliminate the need for a sealing mechanism between the filter element A and the casings of the air cleaner.

Further, the filter medium 101 is made of the sintered synthetic resin, and the frame 80 is made of the sintered synthetic resin similar to that for the filter medium 101. This may facilitate reuse of the filter element A.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A filter element for an air cleaner, comprising a filter medium having a plurality of basic pocket shaped filter units, with each filter unit having an opening edge defining a regular polygon, a closed edge, and a plurality of filtration walls arranged therebetween, with the filtration walls defining a plurality of generally vertical edges having opposed ends, with one end of each generally vertical edge interconnected to said opening edge and the other end of each generally vertical edge converging toward and interconnecting with said closed edge, said filter units arranged into a honeycomb structure, and said filter medium being integrally formed of a porous sintered material produced by sintering powdered synthetic resin.

2. The filter element as defined in claim 1, wherein some of said vertical edges of said basic filter units are joined with each other.

3. The filter element as defined in claim 1, wherein said closed edges of said basic filter units are connected with each other.

4. The filter element as defined in claim 1, wherein all of said filtration walls comprise plane walls.

5. The filter element as defined in claim 1, wherein all of said filtration walls comprise three-dimensional skew walls.

6. The filter element as defined in claim 1, further comprising a side wall surrounding said filter medium, said side wall being integrally formed with said filter medium.

7. A filter element for an air cleaner comprising a filter medium and a frame surrounding the filter medium, wherein said filter medium has a corrugated structure comprising a plurality of basic filter units, and wherein each of said basic filter units is a channel member constituted of a wedge-shaped filtration wall and a pair of side walls, and wherein said filter medium is integrally formed of a porous sintered material produced by sintering powdered synthetic resin.

8. The filter element as defined in claim 7, wherein said frame is formed of powdered synthetic resin different from the powdered synthetic resin for said filter medium, said powdered synthetic resin for said frame having softness and elasticity greater than those of the powdered synthetic resin for said filter medium.

9. The filter element as defined in claim 1, wherein at least one of said filtration walls comprise plane walls.

10. The filter element as defined in claim 1, wherein at least one of said filtration walls comprises a three-dimensional skew wall.

11. The filter element as defined in claim 1, wherein not all of said filtration walls comprise plane walls.

12. The filter element as defined in claim 1, wherein not all of said filtration walls comprise three-dimensional skew walls.

13. The filter element as defined in claim 1, wherein said honeycomb structure is a gridded pattern.

\* \* \* \* \*